(12) United States Patent
Bauchot et al.

(10) Patent No.: US 9,858,248 B2
(45) Date of Patent: Jan. 2, 2018

(54) HOTSPOT NAVIGATION WITHIN DOCUMENTS

(71) Applicant: International Business Machines Corporation, Armonk, NY (US)

(72) Inventors: Frederic Bauchot, Saint-Jeannet (FR); Georges-Henri Moll, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/083,399

(22) Filed: Mar. 29, 2016

(65) Prior Publication Data
US 2017/0286373 A1 Oct. 5, 2017

(51) Int. Cl.
*G06F 17/30* (2006.01)
*G06F 17/22* (2006.01)

(52) U.S. Cl.
CPC .... *G06F 17/2241* (2013.01); *G06F 17/30958* (2013.01)

(58) Field of Classification Search
CPC .............. G06F 17/2241; G06F 17/30958
See application file for complete search history.

(56) References Cited

U.S. PATENT DOCUMENTS

| 6,992,687 | B1 * | 1/2006 | Baird | G06F 17/241 |
| | | | | 707/E17.013 |
| 7,418,656 | B1 * | 8/2008 | Petersen | G06F 17/241 |
| | | | | 715/230 |
| 7,486,292 | B2 * | 2/2009 | Itoh | G06T 11/206 |
| | | | | 345/440 |
| 7,859,539 | B2 * | 12/2010 | Beckman | G06F 3/0485 |
| | | | | 345/473 |
| 7,861,149 | B2 | 12/2010 | Wang et al. | |
| 7,913,166 | B2 * | 3/2011 | Clark | G06F 3/0481 |
| | | | | 715/212 |
| 8,281,250 | B2 | 10/2012 | Carter et al. | |
| 8,321,780 | B2 * | 11/2012 | Erwig | G06F 17/246 |
| | | | | 715/212 |

(Continued)

FOREIGN PATENT DOCUMENTS

EP 0933712 A1 8/1999

OTHER PUBLICATIONS

Zhou et al. "QuikScan: Facilitating Reading and Information Navigation Through Innovative Document Formatting", Professional Communication Conference, 2009. IPCC 2009. IEEE International; Jul. 2009.

*Primary Examiner* — Scott Baderman
*Assistant Examiner* — Mario M Velez-Lopez
(74) *Attorney, Agent, or Firm* — Brown & Michaels, PC; John R. Pivnichny

(57) ABSTRACT

Suggesting navigation to a user between multiple spots in a document by creating a hotspot graph based on a list of hotspots in the document which are frequently traveled to or edited by the user, monitoring user actions within the document and storing each action as a history element in a repository; and if the user is detected as navigating away from a hotspot in the document or from a spot which is not contained in a hotspot to a hotspot, displaying a list of hotspots in which the user would travel to within the document, ordered based on the probability associated with arcs between the nodes of the hotspot graph.

18 Claims, 6 Drawing Sheets

(56) References Cited

U.S. PATENT DOCUMENTS

| | | | |
|---|---|---|---|
| 2003/0011601 A1* | 1/2003 | Itoh | G06T 11/206 |
| | | | 345/440 |
| 2003/0074416 A1* | 4/2003 | Bates | G06F 17/30884 |
| | | | 709/217 |
| 2005/0149576 A1 | 7/2005 | Marmaros et al. | |
| 2006/0080594 A1* | 4/2006 | Chavoustie | G06F 17/246 |
| | | | 715/218 |
| 2007/0079230 A1* | 4/2007 | Vignet | G06F 3/0485 |
| | | | 715/212 |
| 2010/0262908 A1 | 10/2010 | Gallo et al. | |
| 2014/0033133 A1* | 1/2014 | Pegg | H04M 3/567 |
| | | | 715/863 |
| 2015/0242377 A1 | 8/2015 | Glueck | |

* cited by examiner

HOTSPOT NAVIGATION WITHIN DOCUMENTS

BACKGROUND

The present invention relates to navigation within a document, and more specifically to navigation between portions of the document designated as frequently visited by a user and other portions within a document.

When editing documents, for example text, spreadsheets or presentations, very often some portions of the documents are read and edited significantly more than others. The portions of the documents which are read and edited significantly more than others are "hot spots" and can be identified through statistics relating to user interaction and other factors.

SUMMARY

According to one embodiment of the present invention, a method of suggesting navigation to a user between multiple spots in a document is disclosed. The method comprising the steps of: a computer creating a hotspot graph based on a list of hotspots in the document which are frequently traveled to or edited by the user, the computer monitoring user actions within the document and storing each action as a history element in a repository; and if the user is detected as navigating away from a hotspot in the document or from a spot which is not contained in a hotspot to a hotspot, the computer displaying a list of hotspots in which the user would travel to within the document, ordered based on the probability associated with the arc between the nodes of the hotspot graph. The computer creating a hotspot graph by the steps of: assigning nodes to each hotspot in the document; assigning an additional node representing any remaining spots of the document which are not contained in a hotspot; and linking each node to at least one other node through arcs, each arc containing a probability representing a likelihood of a user navigating from the node to the at least one other node.

According to another embodiment of the present invention, a computer program product for suggesting navigation to a user between multiple spots in a document is disclosed. The computer program product comprising a computer comprising at least one processor, one or more memories, one or more computer readable storage media, the computer program product comprising a computer readable storage medium having program instructions embodied therewith, the program instructions executable by the computer to perform a method comprising: creating, by the computer, a hotspot graph based on a list of hotspots in the document which are frequently traveled to or edited by the user, monitoring, by the computer, user actions within the document and storing each action as a history element in a repository; and if the user is detected as navigating away from a hotspot in the document or from a spot which is not contained in a hotspot to a hotspot, displaying, by the computer, a list of hotspots in which the user would travel to within the document, ordered based on the probability associated with the arc between the nodes of the hotspot graph. The hotspot graph being creating, by the computer, by the program instructions of: assigning nodes to each hotspot in the document; assigning an additional node representing any remaining spots of the document which are not contained in a hotspot; and linking each node to at least one other node through arcs, each arc containing a probability representing a likelihood of a user navigating from the node to the at least one other node.

According to another embodiment of the present invention, a computer system for suggesting navigation to a user between multiple spots in a document is disclosed. The computer system comprising a computer comprising at least one processor, one or more memories, one or more computer readable storage media having program instructions executable by the computer to perform the program instructions comprising: creating, by the computer, a hotspot graph based on a list of hotspots in the document which are frequently traveled to or edited by the user, monitoring, by the computer, user actions within the document and storing each action as a history element in a repository; and if the user is detected as navigating away from a hotspot in the document or from a spot which is not contained in a hotspot to a hotspot, displaying, by the computer, a list of hotspots in which the user would travel to within the document, ordered based on the probability associated with the arc between the nodes of the hotspot graph. The hotspot graph being creating, by the computer, by the program instructions of: assigning nodes to each hotspot in the document; assigning an additional node representing any remaining spots of the document which are not contained in a hotspot; and linking each node to at least one other node through arcs, each arc containing a probability representing a likelihood of a user navigating from the node to the at least one other node.

DETAILED DESCRIPTION

In an illustrative embodiment of the present invention, smart navigation based on a history of navigation by one or more users allows navigation between the hotspots to be predicted. Hotspots are portions of a document, for example a document containing text, numbers, symbols, pictures, video; a spreadsheet; a presentation; or other document, which are read and edited significantly more than other portions of the document. Each of the hotspots is represented in a graph by a single node. The portions of the document that are not receiving navigation above a designated threshold are deemed as 'other' and may include multiple locations within the document and are grouped together in a hotspot graph as a single node of the graph representing "elsewhere in the document".

Figure 1:
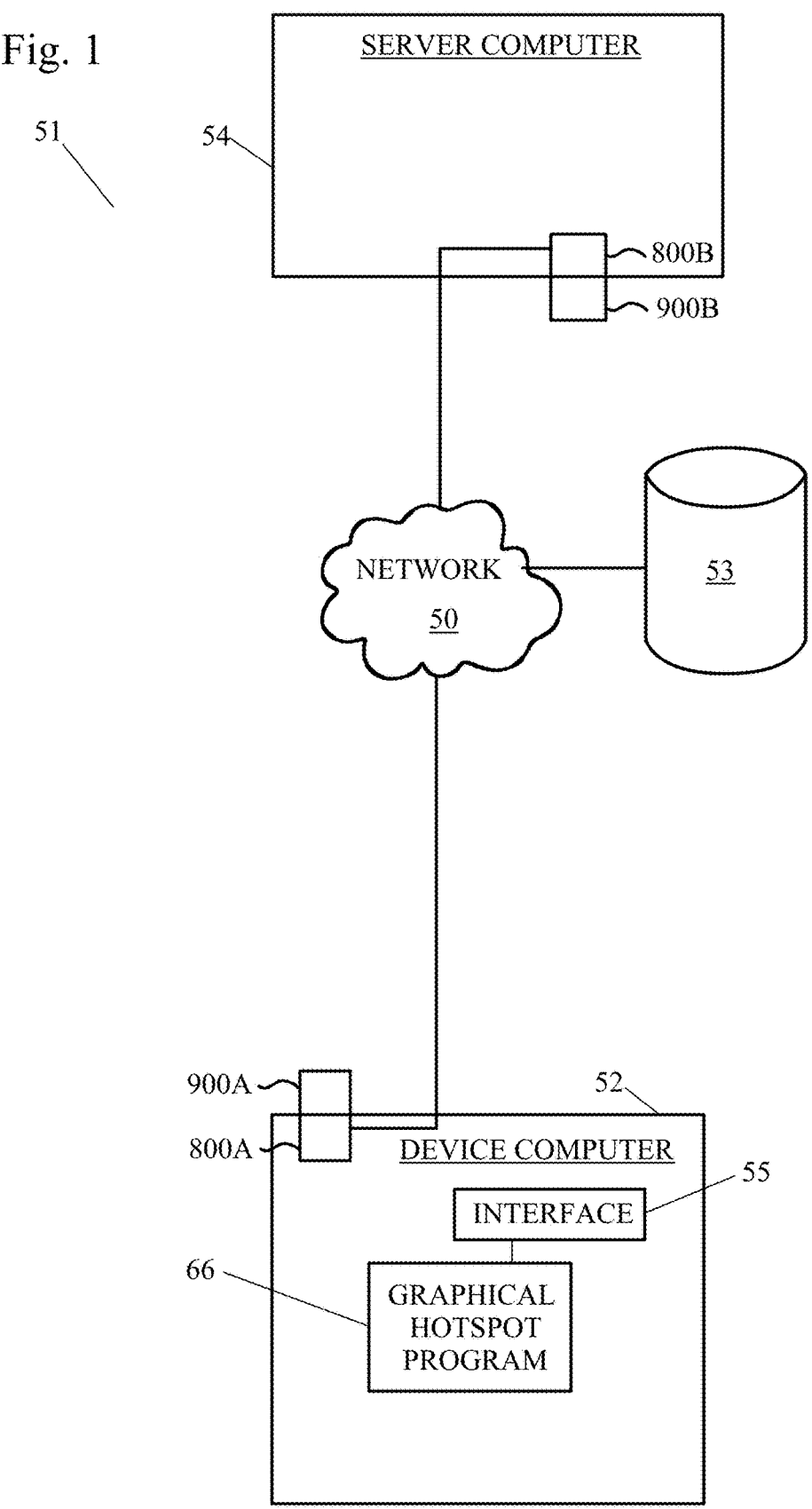
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, a network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, server computer 54 and a device computer 52 are all connected to network 50. In other exemplary embodiments, network data processing system 51 may include additional client computers, storage devices, server computers, and other devices not shown.

Figure 6:
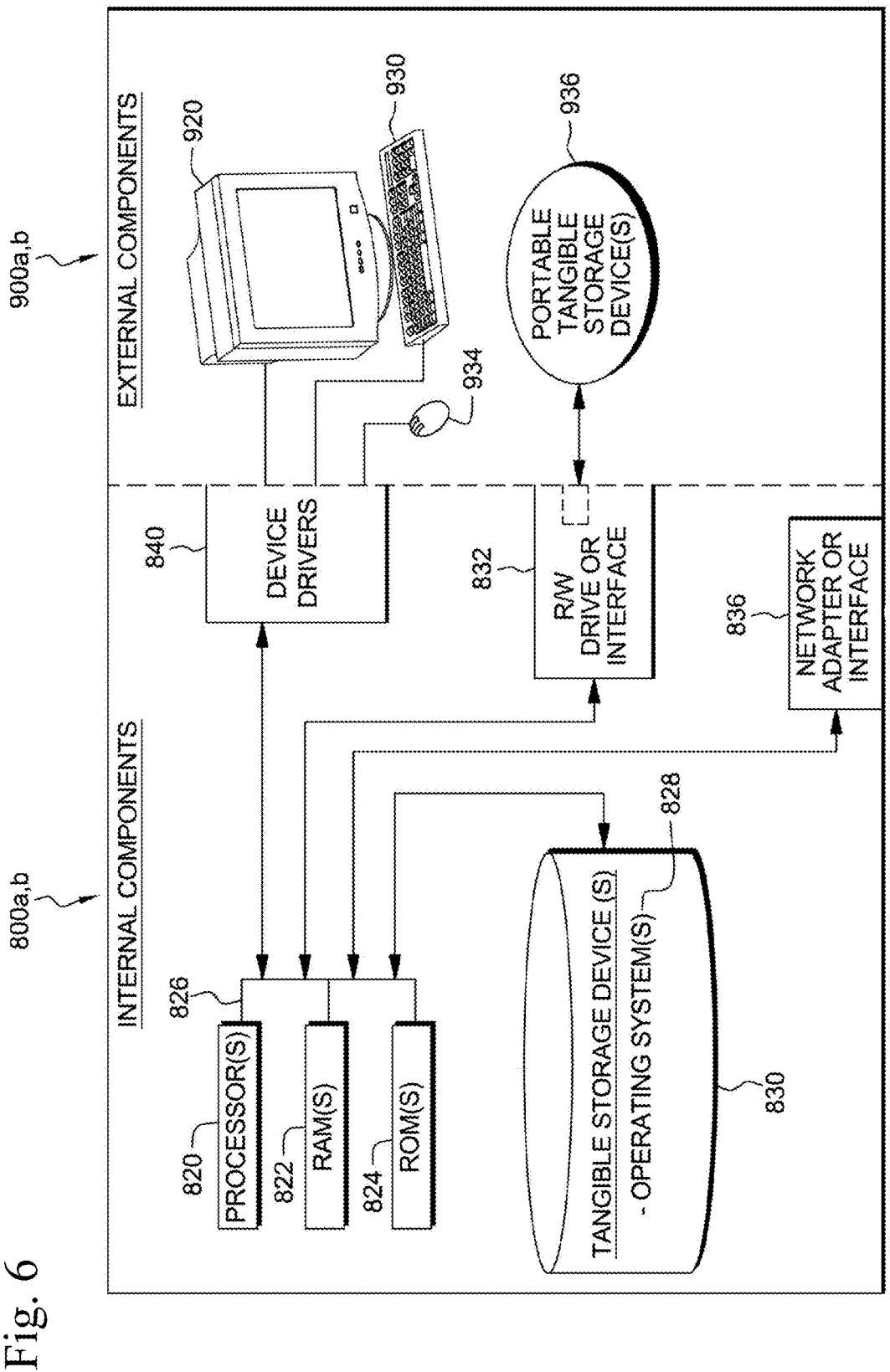
FIG. 6 illustrates internal and external components of a client computer and a server computer in which illustrative embodiments may be implemented.

The device computer 52 includes a set of internal components 800a and a set of external components 900a, further illustrated in FIG. 6. The device computer 52 may be, for example, a netbook, a laptop computer, a desktop computer, or any other type of computing device.

The device computer 52 may contain an interface 55. Through interface 55, first device computer 52 can communicate with the graphical hotspot program and/or the server computer 54, for example, through a command line interface, a graphical user interface (GUI), or a web user interface (WUI). The graphical hotspot program may monitor user interactions with documents, such as view, editing and clicking or selecting of specific portions of the documents or items in the document through the interface 55. The interface 55 may also display a list of proposed hotspots for the user to travel to within a document. The graphical hotspot program 66, as well as other programs, can communicate with other computers and the server computer 54 through the network 50.

Server computer 54 includes a set of internal components 800b and a set of external components 900b illustrated in FIG. 6. Server computer 54 may contain an interface. The interface can be, for example, a command line interface, a graphical user interface (GUI), or a web user interface (WUI) through which access to a graphical hotspot program 66 may occur. Alternatively, the graphical hotspot program 66 may be on server computer 54.

In the depicted example, server computer 54 may provide information, such as boot files, operating system images, and applications to device computer 52. Server computer 54 can compute the information locally or extract the information from other computers on network 50.

Program code and programs such as the placeholder management system program 66 may be stored on at least one of one or more computer-readable tangible storage devices 830 shown in FIG. 6, on at least one of one or more portable computer-readable tangible storage devices 936 as shown in FIG. 6, or on storage unit 53 connected to sever computer 54, or may be downloaded to a computer, such as device computer 52 or server computer 54, for use. For example, program code and programs such as graphical hotspot program 66 may be stored on at least one of one or more storage devices 830 on server computer 54 and downloaded to device computer 52 over network 50 for use on device computer 52. Alternatively, server computer 54 can be a web server, and the program code, and programs such as graphical hotspot program 66 may be stored on at least one of the one or more storage devices 830 on server computer 54 and accessed on device computer 52. In other exemplary embodiments, the program code, and programs such as graphical hotspot program 66 may be stored on at least one of one or more computer-readable storage devices 830 on device computer 52 or distributed between two or more servers.

In the depicted example, network data processing system 51 uses the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 6 illustrates internal and external components of the device computer 52 and server computer 54 in which illustrative embodiments may be implemented. In FIG. 6, the device computer 52 and the server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, graphical hotspot program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Graphical hotspot program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Graphical hotspot program 66 can be downloaded to device computer 52 and server computer 54 from an external computer via a network (for example, the Internet, a local area network or other, wide area network) and network adapter or interface 836. From the network adapter or interface 836, device monitor program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Graphical hotspot program 66 can be written in various programming languages including low-level, high-level, object-oriented or non object-oriented languages. Alternatively, the functions of graphical hotspot program 66 can be implemented in whole or in part by computer circuits and other hardware (not shown).

Figure 7:
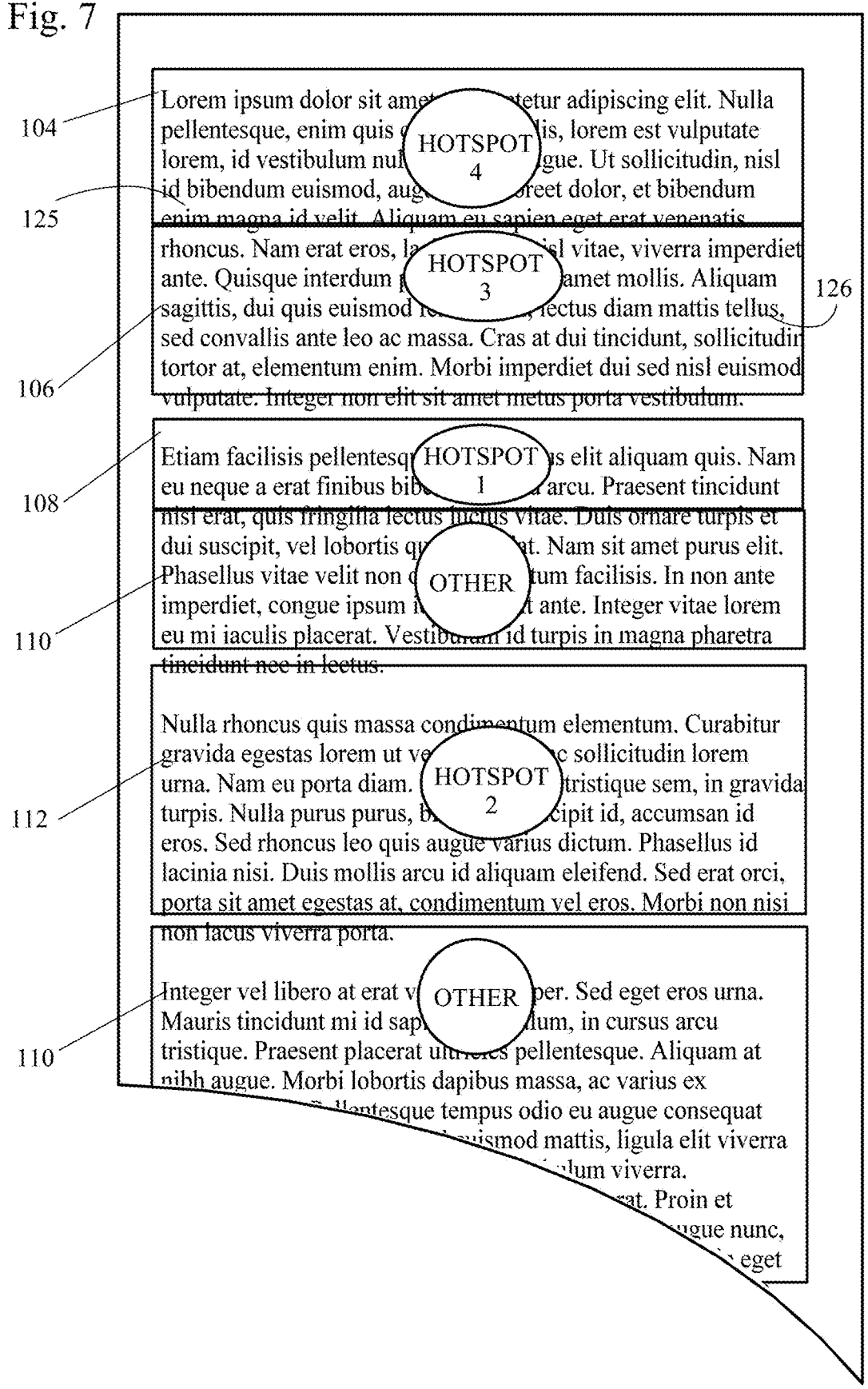
FIG. 7 shows an example of a document with hotspots.

FIG. 7 shows a schematic of a portion of a document with computer-generated meaningless "lorem ipsum" text for example purposes. The document 102 has four identified hotspots enclosed in boxes, which includes hotspot one, hotspot two, hotspot three, hotspot four. The rest of the document is identified as 'other'—that is, text which is not in a hotspot. There may be multiple 'other' spots 110 as they indicate all of the areas of the document that isn't designated as "hotspot n", with n being a number identifying the hotspot.

Figure 5:
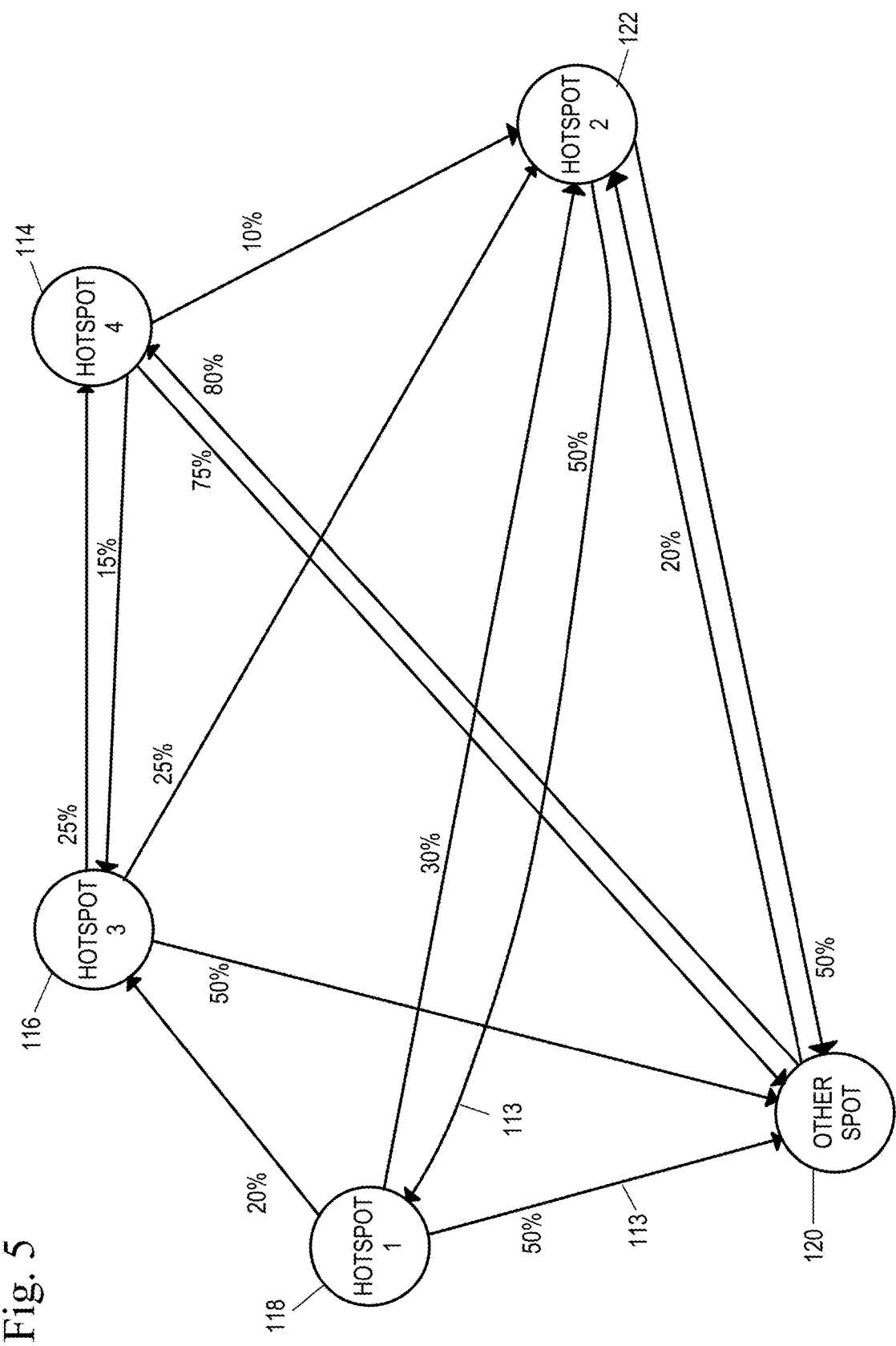
FIG. 5 shows an example of a hotspot graph.

FIG. 5 shows an example of a hotspot graph. In the graph, nodes 104, 106, 108, 112 representing hotspots and an 'other' spot 102 identified within the document 102 are connected through arcs 113. The direction of navigation to and from the nodes 114-122, representing hotspots 1-4 and 'other' in the document 102, is indicated by arrow heads. The arrow heads also represent a directed edge for travel from a node to another node. A probability of navigating between specific nodes (hotspots and other spot) is shown next to each arc. In FIG. 5, arcs with 0% probability are not represented. It should also be noted that the sum of all outgoing arcs 113 from a given node 114-122 is always 100%.

Based on FIG. 5, a user viewing, editing or clicking in hotspot one 108 of a document 102, indicated in the graph by the hotspot one node 118, has a 20% chance of navigating to hotspot three 106, a 30% chance of navigating to hotspot two 112 and a 50% chance of navigating to the 'other' spot 110. The 'other' node 120 corresponds to a portion of the document that does not have a defined hotspot.

A user, viewing, editing or clicking in hotspot two 112 of a document 102, indicated in the graph by the hotspot two node 122, has a 50% chance of navigating to the 'other' spot 110 and a 50% chance of navigating to hotspot one 108.

A user, viewing, editing or clicking in hotspot three 106, indicated in the graph by the hotspot node three 116, has a 50% chance of navigating to the 'other' spot 110, a 25% chance of navigating to hotspot two 112, and a 25% chance of navigating to hotspot four 104.

A user, viewing, editing or clicking in hotspot four 104, indicated in the graph by the hotspot node four 114, has a 75% chance of navigating to the 'other' spot 110, a 15% chance of navigating to hotspot three 106, and a 10% chance of navigating to hotspot two 112.

A user, viewing, editing or clicking in the 'other' spot 110, indicated in the graph by the other spot node 120, has an 80% chance of navigating to hotspot four 104 and a 20% chance of navigating to hotspot two 112.

Figure 2:
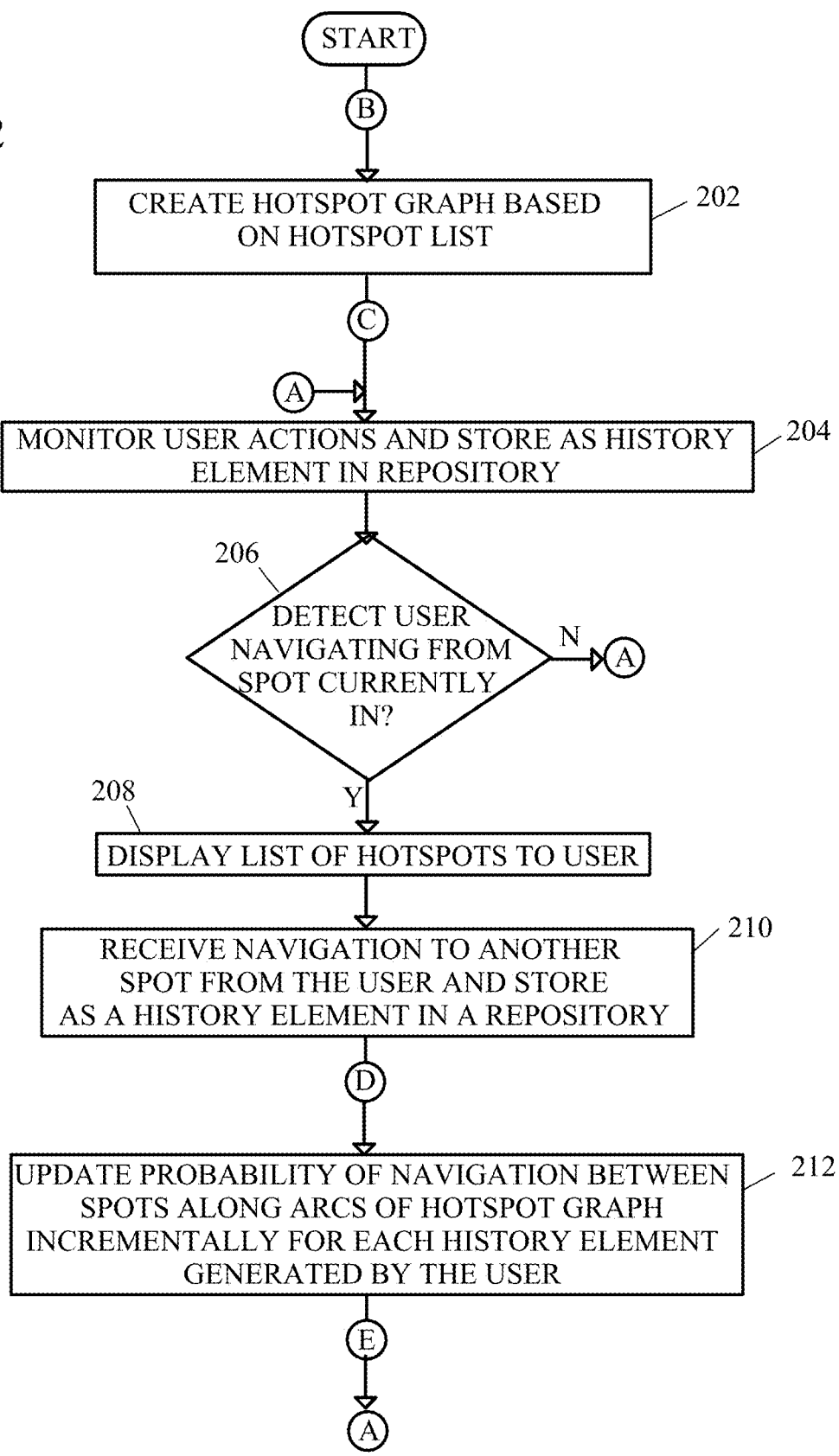
FIG. 2 shows a flow diagram of a method of suggesting navigation between multiple spots in a document to a user.

FIG. 2 shows a flow diagram of a method of suggesting navigation between multiple spots in a document to a user.

In a first step, the graphical hotspot program 66 creates a hotspot graph, as shown in FIG. 5, based on a hotspot list (step 202). The hotspot list may be compiled based on statistics relating to user interaction and other factors and does not form part of this disclosure. The hotspot list contains a list of at least one hotspot and a spot representing the rest of the portions of the document.

Figure 3:
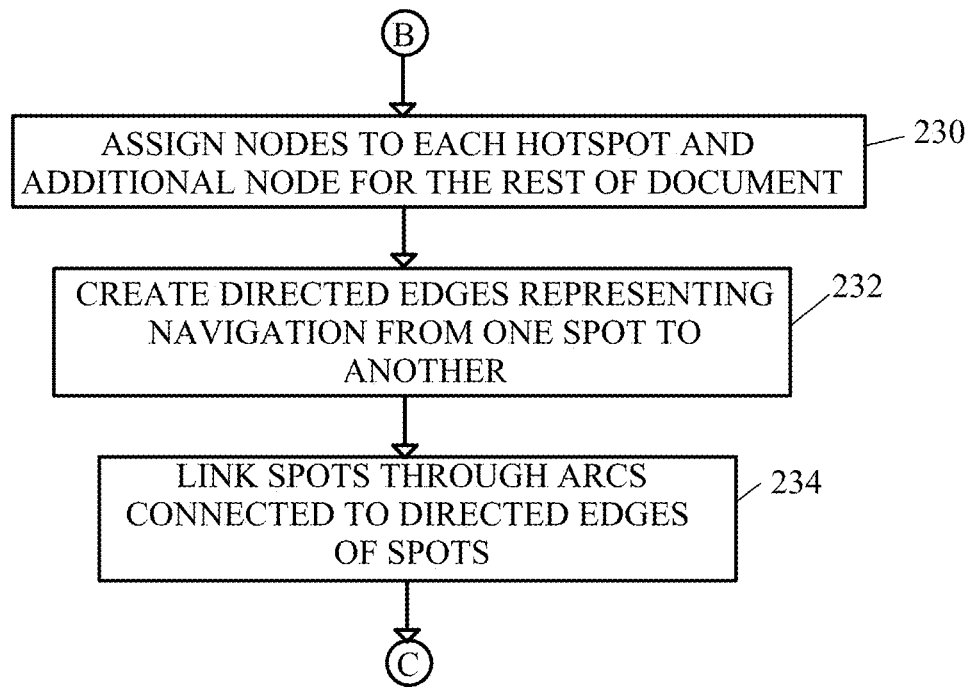
FIG. 3 shows a flow diagram of a method of creating a directed graph of spots in a document.

Step 202 is shown in detail in steps 230-234 of FIG. 3. In a first step, the graphical hotspot program 66 assigns nodes to each hotspot and the rest of the document (step 230). The node for the rest of the document is designated as 'other' and is discussed as its own spot.

Directed edges (for example, 125 and 126 in FIG. 7) representing navigation from one hotspot to another hotspot or spot are created by the graphical hotspot program (step 232). The directed edges are a boundary of the hotspot the user clicks on and is directional. For example in FIG. 7, hotspot three 106 may have at least a first directed edge 125 and a second directed edge 126. The first directed edge may indicate that the user is about to navigate to hotspot four 104. The second directed edge may indicate that the user is about to navigate to hotspot one 108, hotspot two 112 or 'other' spot 110. The hotspots are then linked through arcs 113 to connect the directed edges of the hotspots together (step 234). The directed edges are represented in the hotspot graph by the arrow heads.

Returning to FIG. 2, the graphical hotspot program 66 monitors user actions and stores each action as a history element in a repository (step 204), for example repository 53. It should be noted that the history elements are subjected to a first in first out a method for organizing and manipulating history elements, where the oldest (first) entry, or 'head' of the queue, is processed first.

If the monitoring of the user detects a user about to navigate from the hotspot or 'other' spot, that the user is currently in (step 206), a list of hotspots or 'other' spot which has the highest probability of being traveled to, based on the graph of hotspots is displayed to the user (step 208), for example through interface 55.

For example, based on FIG. 5, if a user was in hotspot one 108 and was clicking on another portion of the document, a display of the mostly likely hotspots navigated to from hotspot one 108 would be displayed to the user. In this case, the list would include the 'other' spot 110, hotspot two 112 and hotspot three 106. The list is preferably ranked based on the likelihood of navigating to the next hotspot (e.g. greatest probability) based on at least accumulated user interaction through history elements. While three spots are discussed, the number of spots on the list may vary.

If the monitoring of the user detects a user about to navigate from the hotspot or 'other' spot that the user is currently in (step 206), the method returns to step 204 of monitoring user actions and storing each action as a history element in a repository.

The graphical hotspot program 66 receives a navigation of the user to another hotspot or spot and stores the navigation from one hotspot to another hotspot or spot as a history element in a repository (step 210), for example repository 53.

The probabilities of navigating between the nodes along the arcs of the hotspot graph are updated for each history element generated by the user (step 212), for example by the graphical hotspot program 66, and the method returns to step 204 of monitoring user actions and storing each action as a history element in a repository. The sub-steps of step 212 are shown in FIG. 4 and are discussed below.

Figure 4:
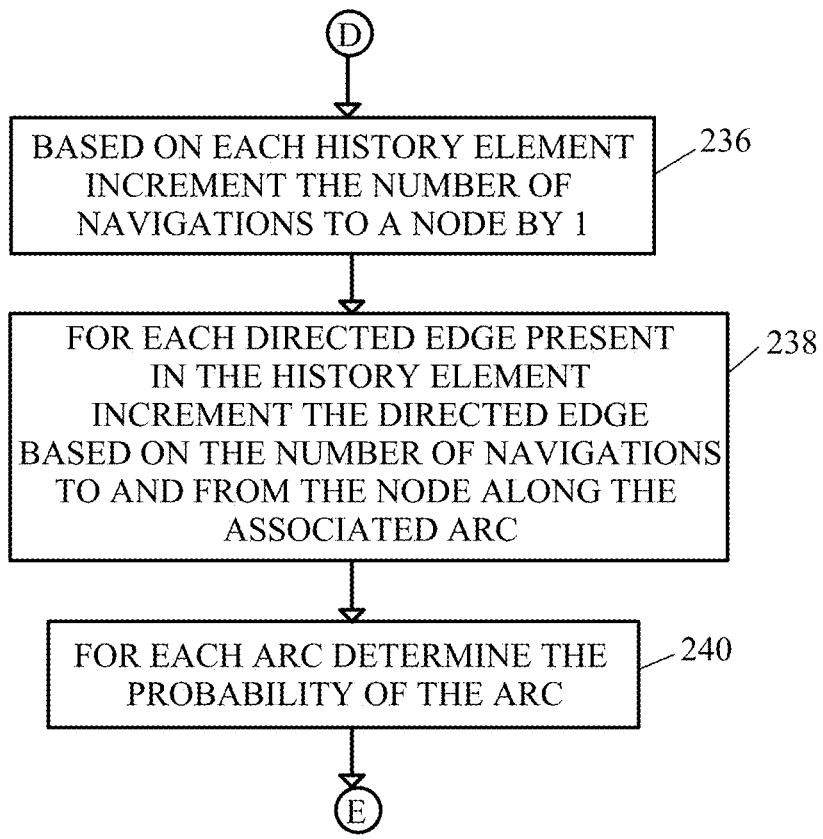
FIG. 4 shows a flow diagram of a method of updating portions of the graph of spots.

FIG. 4 shows a flow diagram of a method of updating portions of the graph of hotspots. Based on each history element in the repository, the graphical hotspot program 66 increments a number of navigations to a node representing a hotspot or spot by 1 (step 236). Then, the number of navigations for an arc between the nodes representing hotspots or spots is incremented by one (step 238). The graphical hotspot program 66 then determines the probability of navigation of an arc by a user between the nodes and updates the hotspot graph (step 240) and the method returns to step 204 of monitoring user actions and storing each action as a history element in a repository.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of suggesting navigation to a user between multiple spots in a document comprising the steps of:
   a computer creating a hotspot graph based on a list of hotspots in the document which are frequently traveled to or edited by the user, the computer creating the hotspot graph by the steps of:
   assigning nodes to each hotspot in the document;
   assigning an additional node representing any remaining spots of the document which are not contained in a hotspot; and
   linking each node to at least one other node through arcs, each arc containing a probability representing a likelihood of a user navigating from the node to the at least one other node;
   the computer monitoring user actions within the document and storing each action as a history element in a repository; and
   if the user is detected as navigating away from a hotspot in the document or from a spot which is not contained in a hotspot to a hotspot, the computer displaying a list of hotspots in which the user would travel to within the document, ordered based on the probability associated with the arc between the nodes of the hotspot graph.

2. The method of claim 1, further comprising creating at least one directed edge for each spot within the document representing navigation from the spot to other spots within the document.

3. The method of claim 1, further comprising the steps of the computer, after the step of detecting the user as navigating away from a hotspot or to a hotspot:
   updating the probabilities of the arcs between nodes based on the history elements representing navigation between spots in the document by the user.

4. The method of claim 3, wherein updating the probabilities of the arcs between nodes based on the history elements representing navigation between spots in the document by the user further comprises the steps of the computer:
   for each history element, incrementing the number of navigations to a node from another node; and
   recalculating the probability for the node traveled to and from along the arc connecting the nodes.

5. The method of claim 1, wherein the document is a document containing text, a presentation or a spreadsheet.

6. The method of claim 1, wherein a sum of the probability of each of the arcs of a node representing a user navigating from the node to the at least one other node is a hundred percent.

7. A computer program product for suggesting navigation to a user between multiple spots in a document comprising a computer comprising at least one processor, one or more memories, one or more computer readable storage media, the computer program product comprising a computer readable storage medium having program instructions embodied therewith, the program instructions executable by the computer to perform a method comprising:
   creating, by the computer, a hotspot graph based on a list of hotspots in the document which are frequently traveled to or edited by the user, creating, by the computer, the hotspot graph by the program instructions of:
   assigning nodes to each hotspot in the document;
   assigning an additional node representing any remaining spots of the document which are not contained in a hotspot; and
   linking each node to at least one other node through arcs, each arc containing a probability representing a likelihood of a user navigating from the node to the at least one other node;
   monitoring, by the computer, user actions within the document and storing each action as a history element in a repository; and
   if the user is detected as navigating away from a hotspot in the document or from a spot which is not contained in a hotspot to a hotspot, displaying, by the computer, a list of hotspots in which the user would travel to within the document, ordered based on the probability associated with the arc between the nodes of the hotspot graph.

8. The computer program product of claim 7, further comprising creating, by the computer, at least one directed edge for each spot within the document representing navigation from the spot to other spots within the document.

9. The computer program product of claim 7, further comprising program instructions of, after the step of detecting, by the computer, the user as navigating away from a hotspot or to a hotspot:
   updating, by the computer, the probabilities of the arcs between nodes based on the history elements representing navigation between spots in the document by the user.

10. The computer program product of claim 9, wherein updating, by the computer, the probabilities of the arcs between nodes based on the history elements representing navigation between spots in the document by the user further comprises the program instructions of:
    for each history element, incrementing, by the computer, the number of navigations to a node from another node; and
    recalculating, by the computer, the probability for the node traveled to and from along the arc connecting the nodes.

11. The computer program product of claim 7, wherein the document is a document containing text, a presentation or a spreadsheet.

12. The computer program product of claim 7, wherein a sum of the probability of each of the arcs of a node representing a user navigating from the node to the at least one other node is a hundred percent.

13. A computer system for suggesting navigation to a user between multiple spots in a document comprising a computer comprising at least one processor, one or more memories, one or more computer readable storage media having program instructions executable by the computer to perform the program instructions comprising:
    creating, by the computer, a hotspot graph based on a list of hotspots in the document which are frequently traveled to or edited by the user, creating, by the computer, the hotspot graph by the program instructions of:
    assigning nodes to each hotspot in the document;
    assigning an additional node representing any remaining spots of the document which are not contained in a hotspot; and
    linking each node to at least one other node through arcs, each arc containing a probability representing a likelihood of a user navigating from the node to the at least one other node;
    monitoring, by the computer, user actions within the document and storing each action as a history element in a repository; and if the user is detected as navigating away from a hotspot in the document or from a spot which is not contained in a hotspot to a hotspot, displaying, by the computer, a list of hotspots in which the user would travel to within the document, ordered based on the probability associated with the arc between the nodes of the hotspot graph.

14. The computer system of claim 13, further comprising creating, by the computer, at least one directed edge for each spot within the document representing navigation from the spot to other spots within the document.

15. The computer system of claim 13, further comprising program instructions of, after the step of detecting, by the computer, the user as navigating away from a hotspot or to a hotspot:
updating, by the computer, the probabilities of the arcs between nodes based on the history elements representing navigation between spots in the document by the user.

16. The computer system of claim 15, wherein updating, by the computer, the probabilities of the arcs between nodes based on the history elements representing navigation between spots in the document by the user further comprises the program instructions of:
for each history element, incrementing, by the computer, the number of navigations to a node from another node; and
recalculating, by the computer, the probability for the node traveled to and from along the arc connecting the nodes.

17. The computer system of claim 13, wherein the document is a document containing text, a presentation or a spreadsheet.

18. The computer system of claim 13, wherein a sum of the probability of each of the arcs of a node representing a user navigating from the node to the at least one other node is a hundred percent.

* * * * *